United States Patent [19]
Jensen

[11] Patent Number: 5,845,583
[45] Date of Patent: Dec. 8, 1998

[54] DUAL-MODE TRANSPORATION SYSTEM AND POWER UNIT

[76] Inventor: Palle Rasmus Jensen, Forha bning sholms Alle 30, Frederiksberg C, Denmark, 1904

[21] Appl. No.: 815,163

[22] Filed: Mar. 11, 1997

Related U.S. Application Data

[63] Continuation-in-part of Ser. No. 532,718, Sep. 11, 1995, abandoned.

[30] Foreign Application Priority Data

Mar. 23, 1993 [DK] Denmark ................... 0320/93

[51] Int. Cl.⁶ ..................... B61C 7/00
[52] U.S. Cl. ............ 105/72.2; 105/35; 105/62.1; 105/145; 104/34; 104/119
[58] Field of Search ................. 105/35, 50, 51, 105/62.1, 141, 145, 72.2; 104/34, 118, 119; 180/65.4, 68.5

[56] References Cited

U.S. PATENT DOCUMENTS

| | | |
|---|---|---|
| 3,225,704 | 12/1965 | Gilvar et al. . |
| 3,397,649 | 8/1968 | Pfeffer . |
| 3,447,481 | 6/1969 | Gorham . |
| 3,497,027 | 2/1970 | Wild . |
| 3,797,600 | 3/1974 | Miner . |
| 4,216,839 | 8/1980 | Gould et al. . |
| 4,339,015 | 7/1982 | Fowkes et al. . |
| 4,923,025 | 5/1990 | Ellers . |
| 5,138,952 | 8/1992 | Low ....................... 105/72.2 |
| 5,289,778 | 3/1994 | Romine ................. 105/72.2 |

FOREIGN PATENT DOCUMENTS

| | | |
|---|---|---|
| 4032-605-A | 3/1992 | Germany . |
| 91/18777 | 12/1991 | WIPO . |
| 93/11016 | 6/1993 | WIPO . |
| 94/21479 | 9/1994 | WIPO . |

*Primary Examiner*—S. Joseph Morano
*Attorney, Agent, or Firm*—Dick and Harris

[57] ABSTRACT

The invention comprises a replaceable power unit and transportation system for a dual-mode vehicle, such as an electric car which can operate on built-in batteries and by way of power supplied by a running rail. The vehicle moreover comprises road wheels for moving on a roadway as well as rail wheels for moving on a railway. The railway is a substantially triangular profile wherein the vehicle includes a downwardly facing rail interface extending in the longitudinal direction. The power unit forms an elongate unit which is adapted to be mechanically and electrically connected to the vehicle by mounting it in the rail interface.

9 Claims, 9 Drawing Sheets

DUAL-MODE TRANSPORATION SYSTEM AND POWER UNIT

This application is a continuation-in-part of Ser. No. 08/532,718, filed Sep. 11, 1995, now abandoned.

BACKGROUND OF THE INVENTION

International patent application no. PCT/DK91/00146 (WO 91/18777) describes a transport system of the dual-mode type, wherein dual-mode vehicles which can drive on a triangular rail, separately or coupled, or as individual electric cars on an ordinary road.

All that is otherwise stated in the above application forms part of the subject application by this reference.

Figure 1:
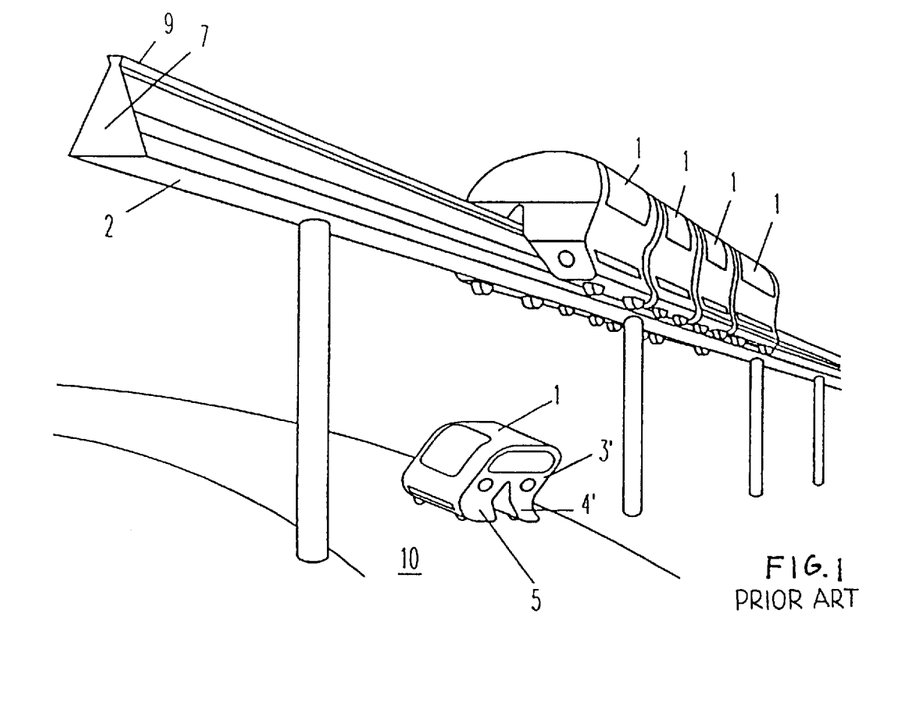
FIG. 1 shows a known dual-mode vehicle functioning as a rail vehicle as well as a road vehicle.
Figure 2:
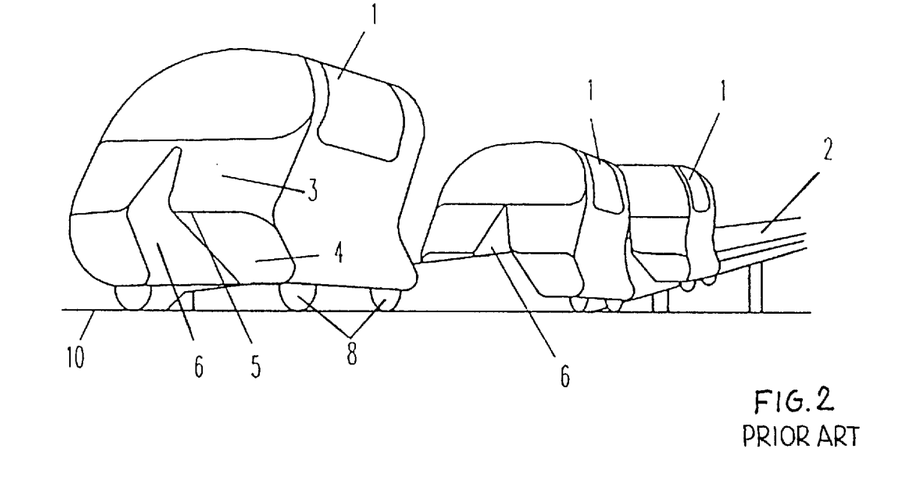
FIG. 2 shows the vehicle in FIG. 1 during the transitional phase from rail operation to road operation, FIG. 3 a,b disclose the principle of the connection of a dual-mode vehicle with a power unit according to the invention, FIG. 4 schematically shows the power unit according to an embodiment of the invention.

The main component of the transport system is a vehicle 1, which is shown in FIGS. 1 and 2 of the drawing, running selectively on a rail 2 of a triangular cross-sectional profile 7 and perhaps a particular brake rail 9 at an upper section of the rail 2. Each vehicle is also fitted with ordinary road wheels 8 for driving on a roadway 10.

The vehicle 1 has a front end and a rear end where the front end has two substantially plane faces 3, 4 which meet at an angle along a horizontal line 5, and where the rear end has two substantially plane faces 3', 4' which likewise meet along a horizontal line 5, as shown, and also explained in the international application mentioned above.

FIG. 2 shows how the dual-mode vehicle 1 is transferred from rail driving, receiving current from the rail, to road driving on the roadway 10 as an independent, electric vehicle on wheels 8 receiving current from built-in batteries.

The vehicle is provided with a downwardly facing rail interface 6 extending in the longitudinal direction and having a cross-sectional profile which allows the vehicle to move on the cross-sectional profile 7 of the rail 2.

Regarding the design of the vehicle 1 as well as the rail 2, reference is made to the international application mentioned above.

When the vehicle 1 leaves the triangular rail, it will move as an electric car with the inherent limited range depending on the capacity of the built-in battery/batteries. The range of such electric cars is currently in the order of 25–100 km dependent on the size of the batteries, the charging conditions thereof, the weight of the vehicle, road conditions etc.

SUMMARY OF THE INVENTION

It is a primary object of the invention to enhance the operating range of a dual-mode vehicle of the above mentioned type, wherein the dual-mode vehicle may comprise a relatively small built-in electrical battery for driving a certain distance on the road.

This primary object has been accomplished by the power unit for an electrically operated dual-mode vehicle. The vehicle comprises road wheels for moving on a roadway and a centrally disposed, downwardly open, groove-shaped rail interface. The interface extends in the longitudinal direction of the vehicle. The rail interface includes a cross-sectional profile which corresponds to the cross-sectional profile of a substantially triangular rail. The rail interface comprises a power transmission means for engaging an electrically conductive section of the rail and a set of rail wheels which engage the rail. The power unit comprises an energy store from which stored energy can be transmitted as electric current to the vehicle. The power unit additionally has an elongate shape having an outer cross-sectional profile which allows it to be selectively inserted in and taken out of the rail interface. The power unit directly engages the rail wheels of the vehicle. In addition, the power unit includes a coupling means for coupling the power unit to the chassis points. These are arranged at such vertical locations in relation to the vehicle chassis that the rail wheels exert a downwardly directed force on the power unit when the coupling means is coupled to the chassis points. The power unit contacting means engages the power transmission means.

This primary object has furthermore been accomplished by the invention of a mounting system for enabling swift and efficient insertion of a power unit in a dual-mode vehicle; a power transmission means for transmitting power between a rail and a dual-mode vehicle and/or between a power unit and a dual-mode vehicle; and a special power rail situated on the substantially triangular rail, respectively.

As will be understood, the longitudinal rail interface in the lower part of the vehicle is utilized for housing the power unit, when the vehicle runs on the road. The range of the vehicle is thus increased without reducing the cabin space or any luggage space. The power unit is adapted to connect to a power transmission means, which again is adapted to connect to the power rail. The power unit may thus supply current to the vehicle and increase the range by the amount of energy supplied by the unit.

Additionally, a holding base on the power unit is provided, so that an elevator means can hold the power unit before and during insertion in or ejection from the vehicle. The holding means can also be used in connection with the ejection of the power unit from the vehicle by means of a special elevator means (not shown), only adapted for ejection.

An advantageous contacting means for the power unit includes power unit contacting means which comprises at least one semicircular spring blade having a radius which corresponds to a disc of the power transmission means. The power transmission means transmits power between the rail and the dual-mode vehicle or between the power unit and the dual-mode vehicle. The rail is of a substantially triangular cross section and is provided with a T-shaped power rail on the upper vertex of the substantially triangular rail. The T-shaped section comprises a first set of conductive areas in a first corner of the horizontal bar and on the upper section of the vertical bar of the T-shaped section. The second set of conductive areas are in the second opposite corner of the T-shaped section. The power transmission means comprises two conductive discs mounted resiliently with respect to the dual-mode vehicle on a location on each side of the T-shaped power rail for engaging and establishing electrical contact to the first and second sets of conductive areas. The discs are caused to rotate when they are engaged with the power rail and, in turn, the vehicle moves along the rail.

Preferably, the power unit is adapted to engage the rail wheels of the dual-mode vehicle for holding the power unit.

Another advantageous feature of the power unit is that the power unit is adapted to be held by the resilient action of the rail wheels of the dual-mode vehicle.

According to the invention, the power unit can be based either on a combustion engine, fuel cells or batteries. In the case of a combustion engine, the power unit would likewise include a tank for storing fuel and an electric generator. The tank inlet is situated at a front panel or at a rear panel of the power unit which is visible from the outside of the vehicle. In addition, the exhaust pipe is located in the rear panel of the power unit or on the underside of the power unit.

For reasons of traffic security and low air drag resistance the power unit may be shaped so as to be substantially flush with the dual-mode vehicle.

The invention further includes a mounting system for mounting a power unit to a dual-mode vehicle has been defined.

In a first embodiment, a mounting system has been defined, which is especially adapted to a dual-mode vehicle, wherein the properties of the rail wheel suspension and the road wheel suspension differ substantially, especially having regard to the spring constant ratio of the respective suspension systems.

Due to the mounting system having a platform elevator means, the force on the power unit exerted by the vehicle can be automatically adjusted to a predetermined upper value, thereby enabling the power unit to be of low weight due to the limited structural strength required.

In another embodiment, the mounting means is especially adapted to a dual-mode vehicle in which, the properties of the suspension of the road wheels of the vehicle and the properties of the suspension of the rail wheels of the vehicle are substantially alike.

As mentioned above, a power transmission means is defined for selectively transmitting power between a rail and a dual-mode vehicle or between a power unit and a dual-mode vehicle.

As will be explained herein, a power rail has been defined which is adapted to be mounted on the top of a rail as described in international patent application no. PCT/DK91/00146 (WO 91/18777) and which functions together with the power transmission.

Further advantages of the invention will appear from the following description.

THE DRAWING

The invention will now be further explained with reference to the drawing wherein.

EXPLANATION OF THE PREFERRED EMBODIMENTS

FIGS. 1 and 2 of the drawing showing a dual-mode transport system are explained above and will not be further mentioned.

Figures 3A, 3B:
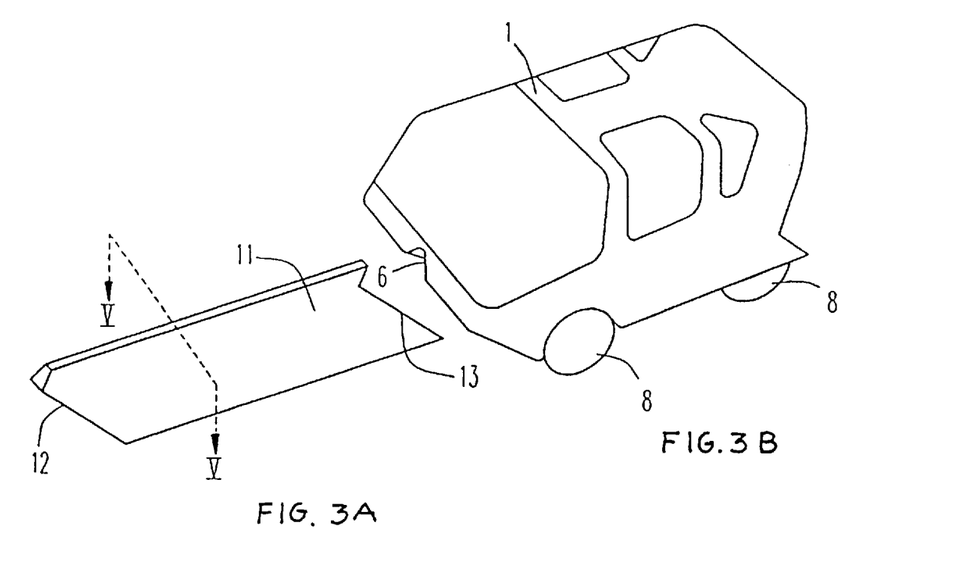

In FIGS. 3a,b the dual-mode vehicle 1 is shown running on a roadway, i.e. as an ordinary electric car. The vehicle 1 has a rail interface 6 which has a substantially triangular cross-section, which is being arranged in such a manner, that the triangle has a point in an upwards direction and is widening downwardly as shown in connection with FIGS. 1 and 2. When the vehicle 1 is not moving on its triangular rail, the mentioned rail interface 6 may, according to the invention, be used for connecting to a power unit 11. The power unit 11 is adapted to be connected under the vehicle 1, so that it will substantially fill the rail interface 6 and be held in relation to the dual-mode vehicle 1 so that the power unit is fixedly and immovably retained. The power unit 11 may have a front end 12 and a rear end 13 which correspond to the front end and rear end of the vehicle 1, so that the respective end faces of the power unit 11 are flush with the front and rear parts of the vehicle.

Figure 5:
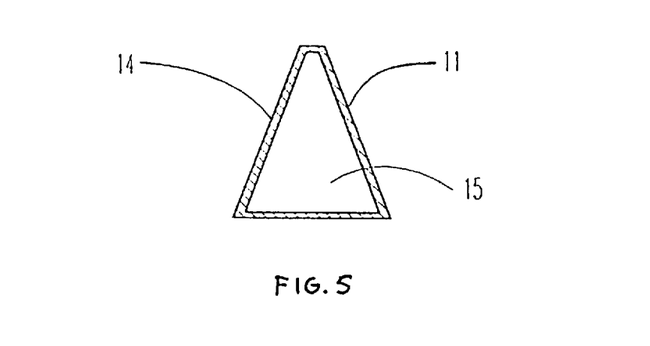
FIG. 5 is a cross-sectional view along V—V in FIG. 3a of an empty power unit.

The cross-sectional profile of the power unit 11 is shown in FIG. 5 and may comprise a unit built up by sheet walls 14 enclosing an elongate hollow space 15.

The power unit 11 is preferably designed in such a manner, that it fully utilizes the rail interface 6, so that a maximum increase of the range of the vehicle can be achieved. This means that the power unit 11 is not necessarily triangular, but the optimum shape of the power unit will be given by the substantially triangular rail 7 and hence the triangular rail interface 6.

Figure 4:
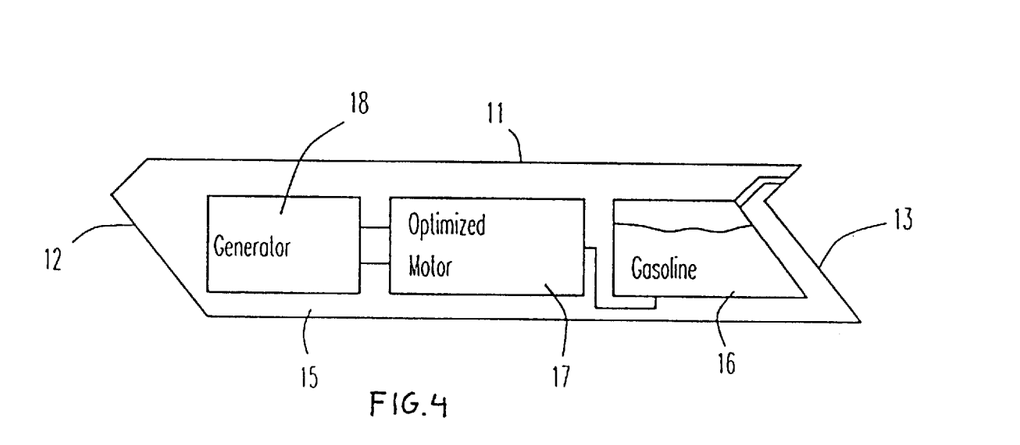

In an embodiment of the invention, which is schematically shown in FIG. 4, the hollow space 15 of the power unit 11 holds a fuel tank 16 for motor fuel, for example gasoline or diesel oil; a combustion engine 17; and a generator 18 for generating electric current. The combustion engine 17 is preferably optimised in relation to efficiency and pollution, for example by being controlled for running at a constant, optimum number of revolutions. If the current from the generator 15 is conducted in parallel over the built-in battery of the vehicle, the generator will only have to supply the average consumption, which means that the engine 17 and the generator 18 may be less powerful than required for supplying the maximum consumption since current peaks etc. are supplied by the battery.

Although FIG. 4 shows the currently preferable embodiment of the invention, which is based on well known technology and which provides a relatively substantial increase in the range of the vehicle outside the rail, it is obvious to a person skilled in the art, that the power unit may be designed in many other ways. The power unit may in a simple embodiment be constituted merely by an additional battery, but may in a more complicated embodiment comprise a hydrogen engine powered by a hydrogen store which for example has been charged (filled) by applying non-polluting energy sources such as wind energy, wave energy, solar energy etc.

The energy store in the power unit according to the invention may also be based on the application of fuel cells or similar technology so that it is possible to provide electricity without using a combustion engine.

Still another possibility for energy storage would be to utilize high speed encapsulated flywheels operating in vacuum.

It is obvious to a person skilled in the art that the power unit according to the invention may be built up by any type of energy store, provided it can be converted into electric energy for the vehicle.

A power unit communication and control unit (not shown) may be included in the power unit for the exchange of command and status signals between the power unit and the dual-mode vehicle. Such command and status signals, relating to the operational state of the power unit and the commands given by the driver, could for instance be multiplexed and overlayered as signals on the power supply lines from the power unit in a known manner.

Having regard to FIGS. 6–10 details relating to the power unit shall now be explained.

Figure 6:
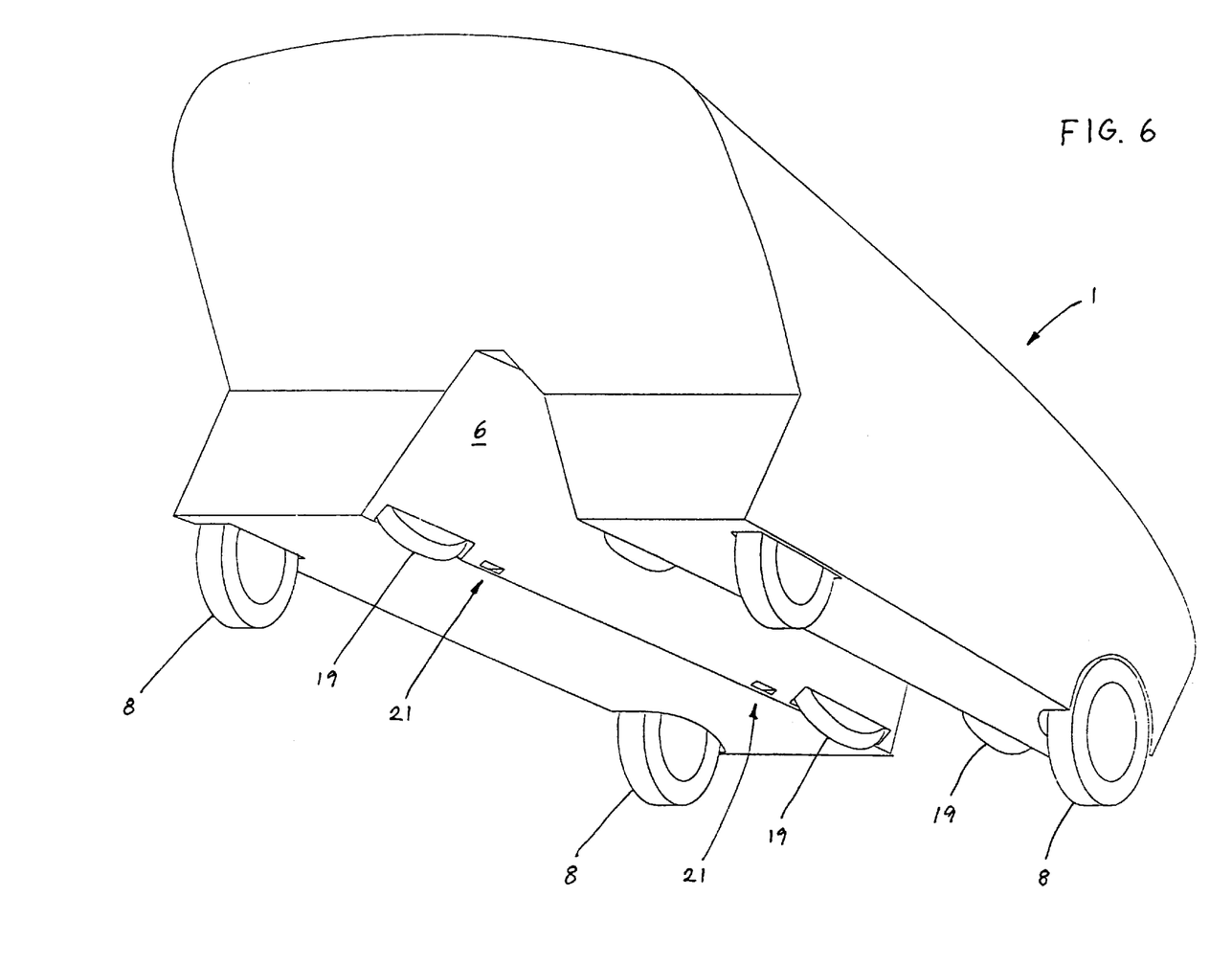
FIG. 6 shows the dual-mode vehicle according to the invention from below and in particular a rail interface.

As appears from FIG. 6, wherein the dual-mode vehicle is shown from below, two sets of wheels are visible: A set of road wheels 8 for running on the road outside the rail 7 and a set rail wheels 19, 20 for moving on the rail 7. The set of rail wheels also include the upper rail wheels denoted by reference numeral 20 which is shown in FIG. 7.

Figure 8:
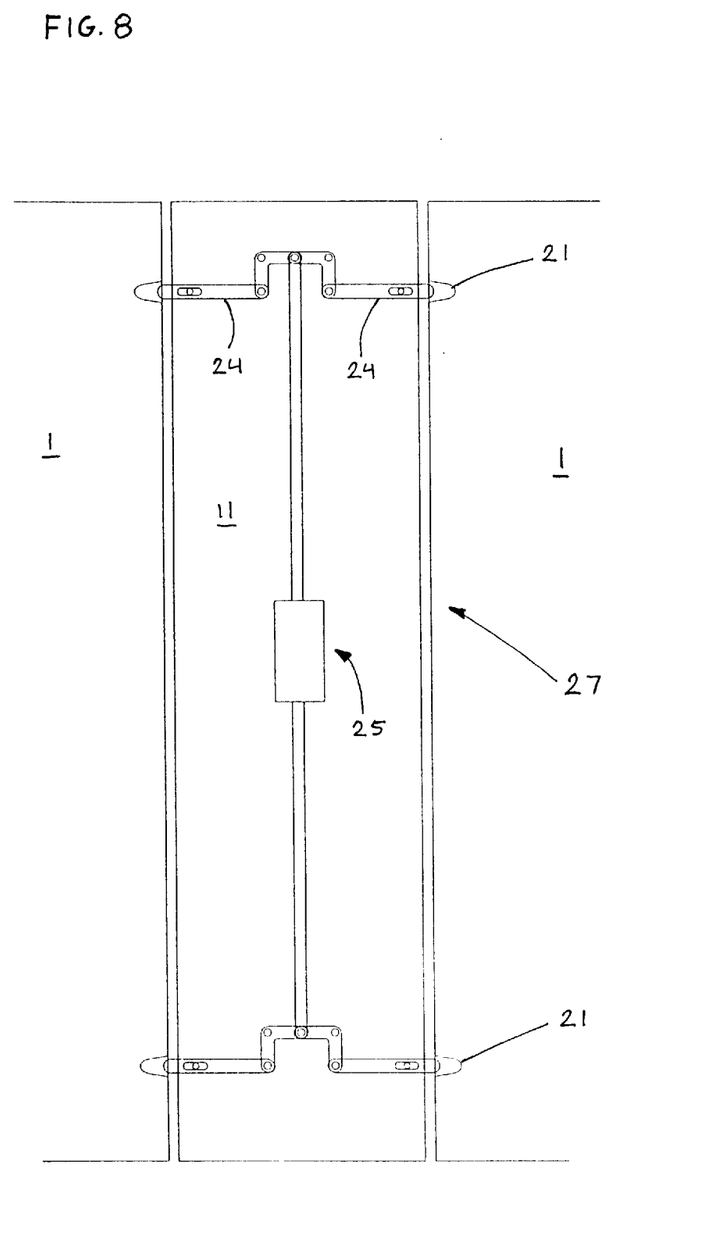

At the bottom of the dual-mode vehicle 1 a set of chassis points 21 which can be shaped like apertures are provided for engaging with a locking means 27 of the power unit 11. The locking means 27, which is shown in detail on FIG. 8, is arranged at or within the underside of the power unit and comprises a number of elongate members 24 which selectively can be inserted into the apertures in the vehicle by means of an arrangement of rods and an actuating means 25.

Figure 7:
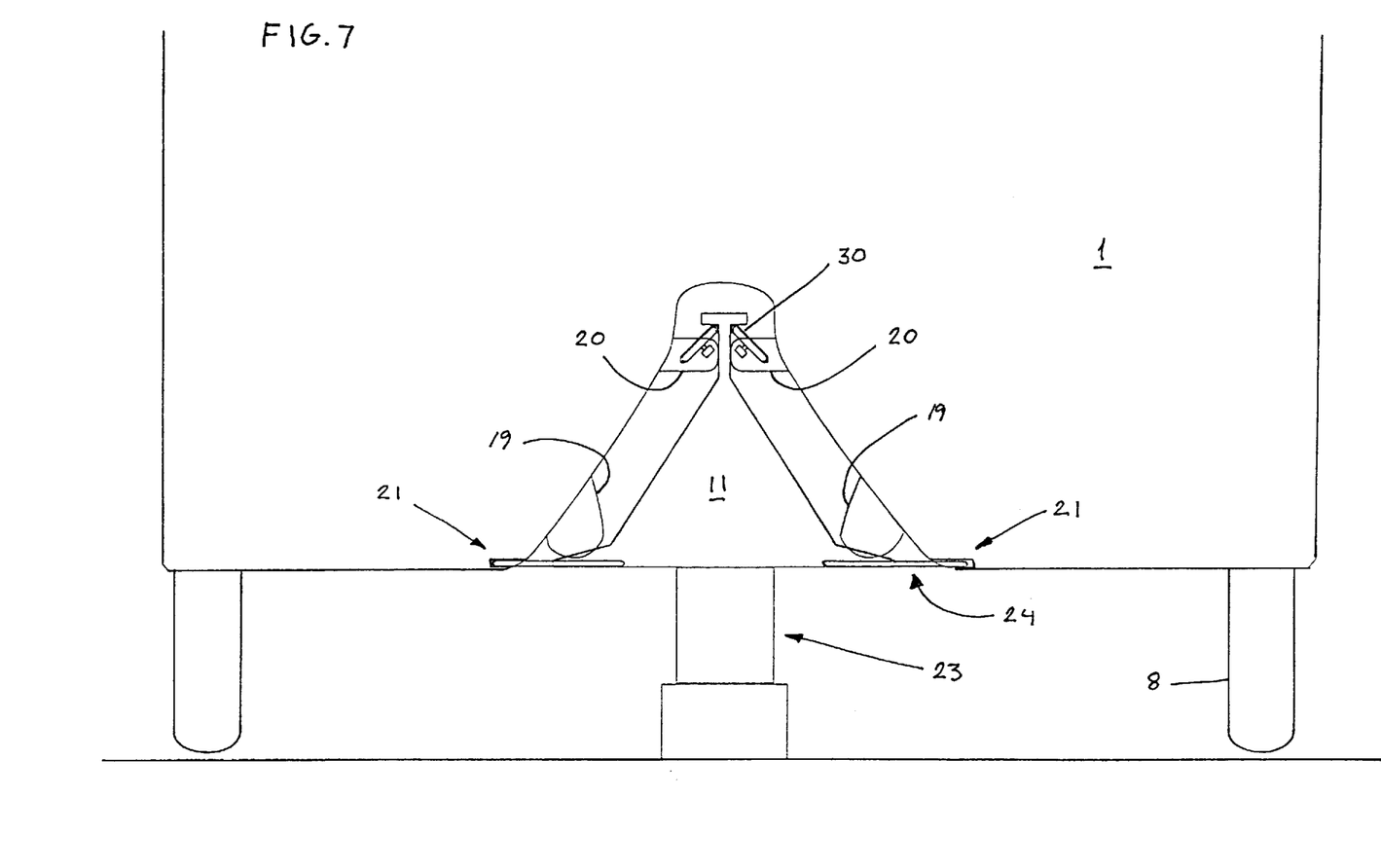
FIG. 7 shows a cross-sectional view of the rail interface of the dual-mode vehicle wherein a power unit is inserted, FIG. 8 discloses a locking means of the power unit.

As appears from FIG. 7, the power unit 11 is inserted in a position where it is retained in the vehicle 1 by the force from the resilient action of the rail wheels 19, which force is exerted in a direction downwards against a surface of the power unit 11, in such a manner that the rail wheels 19 contributes to retaining the power unit 11 fixedly and steadily in the vehicle.

The upper rail wheels 20 exert opposite forces in a lateral direction against the power unit 11 and retain the power unit fixedly and steadily in a lateral direction.

In FIG. 7 the power unit 11 is shown inserted by means of a power unit elevator means 23, placed underneath the vehicle, carrying the weight of the power unit and partly or fully the weight of the vehicle.

The power unit elevator 23 may form part of a mounting means, which also controls the locking means, for instance by the provision of a wired or wireless communication line between the power unit and a control center (not shown) situated on the ground.

The power unit elevator 23 can preferably engage an area (not shown) on the underside of the power unit, whereto a type of retention means, such as a number of indents and oppositely shaped engaging members, are provided, for preventing the power unit from falling off the elevator means 23, but not restricting movement of the power unit in a vertical direction.

Figure 9:
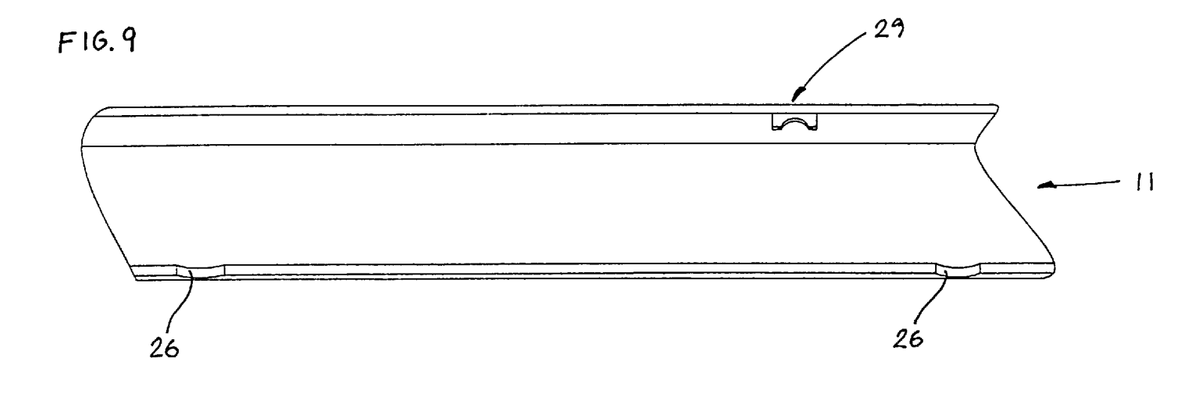
FIG. 9 shows a contacting means and indents for coupling to rail wheels of the power unit.

In FIG. 9, the power unit 11 is shown to disclose a number of indents 26 in the lower section of the unit 11 for engaging at least some of the rail wheels 19 of the dual-mode vehicle. These indents 26 will track the power unit 11 into correct position when the power unit is pressed up against the vehicle and will provide additional retention of the power unit in the travel direction.

Figure 10:
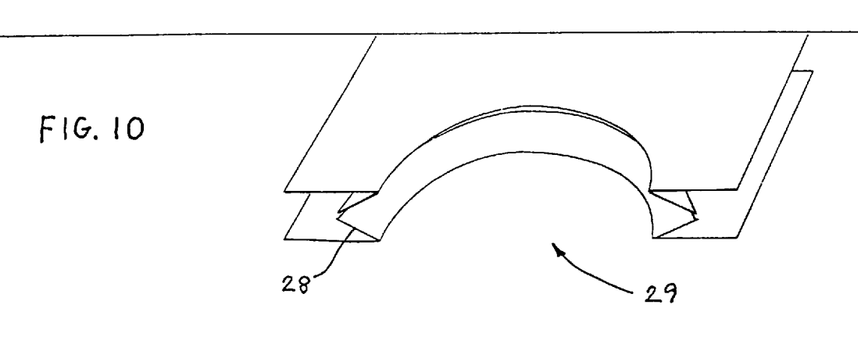
FIG. 10 shows the contacting means in detail.

Close to an upper edge of the power unit 11 at least two contact members 29, shown on FIGS. 9 and 10 are provided, wherein each member 29 comprises two semicircular blade members 28, which may engage a corresponding conductive disc 30 of a power transmission means 36 of the dual-mode vehicle. The conductive discs 30 fit between the blades 28, and good electrical contact is thereby secured by means of the resilient action of the blade members urging against the conductive disc.

Figure 11:
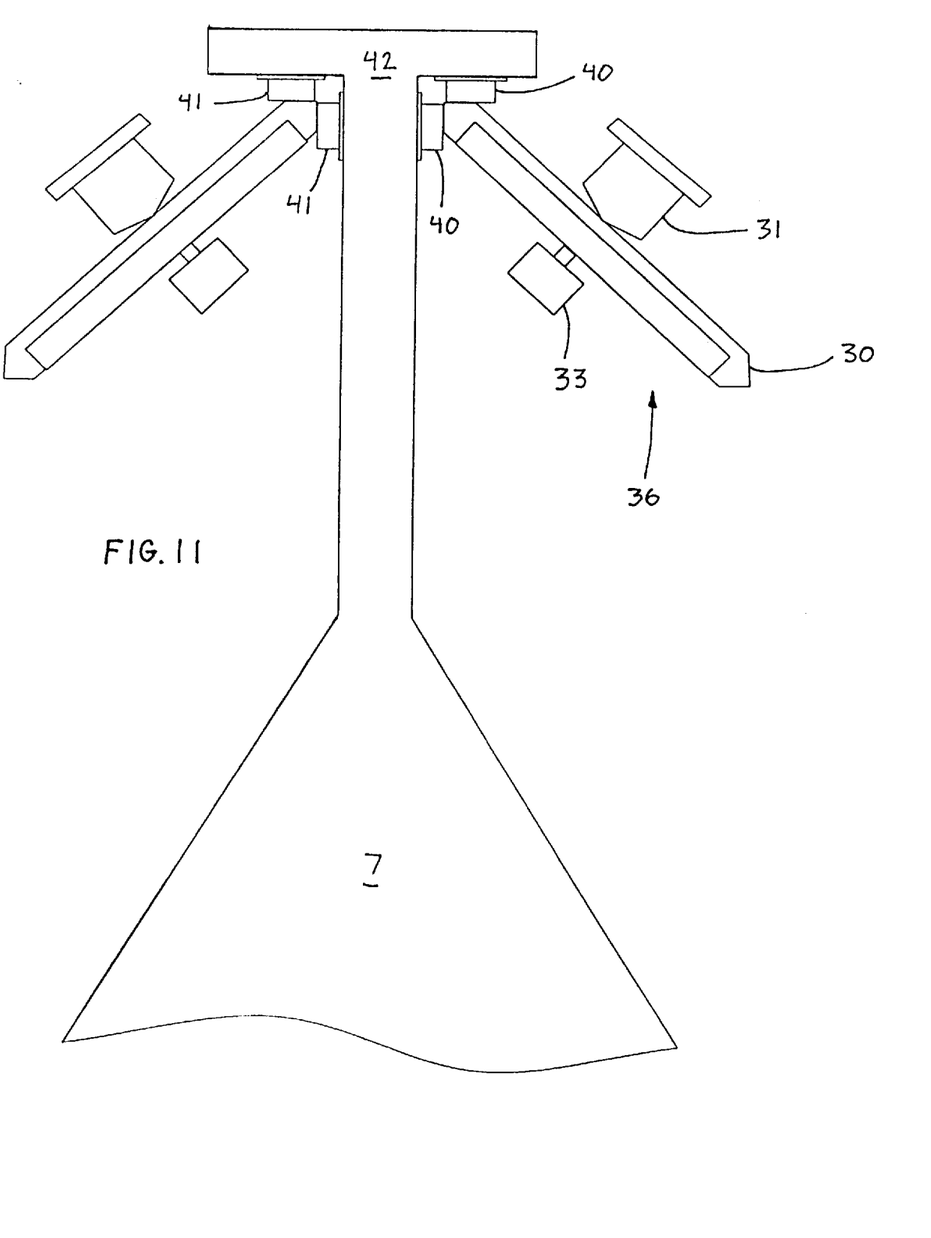
FIG. 11 shows a power transmission means according to the invention.

In FIG. 11 an advantageous embodiment of a power rail 42 and a power transmission means 36 according to the invention is shown for transmitting electrical power from the power rail to the vehicle. The power rail 42 is arranged on the triangular rail 7 in extension of the upper vertex of the triangular rail and is shaped like a T seen in cross section.

In the area of the corners of the T, at least two sets of conductive areas 40, 41 are located in or close to the corners of the T, in such a way that each set of conductive areas 40, 41 comprises a conductive area on the upper section of the vertical bar of the T and on the underside of the horizontal bar of the T. In this way, the conductive areas are sufficiently well protected against weather impacts such as snow, ice and water.

The power transmission means 36, which is designed to function in cooperation with the above described power rail 42, preferably comprises two rotating discs 30, each engaging a respective set of conductive areas 40, 41 on each side of the power rail. Each disc 30 is adapted to be in contact with at least the horizontal or the vertical respective contact area 40, 41, and each disc will be in permanent contact with both areas during operation for most of the time, provided that the linearity tolerances of the rail are sufficiently low.

Figure 12:
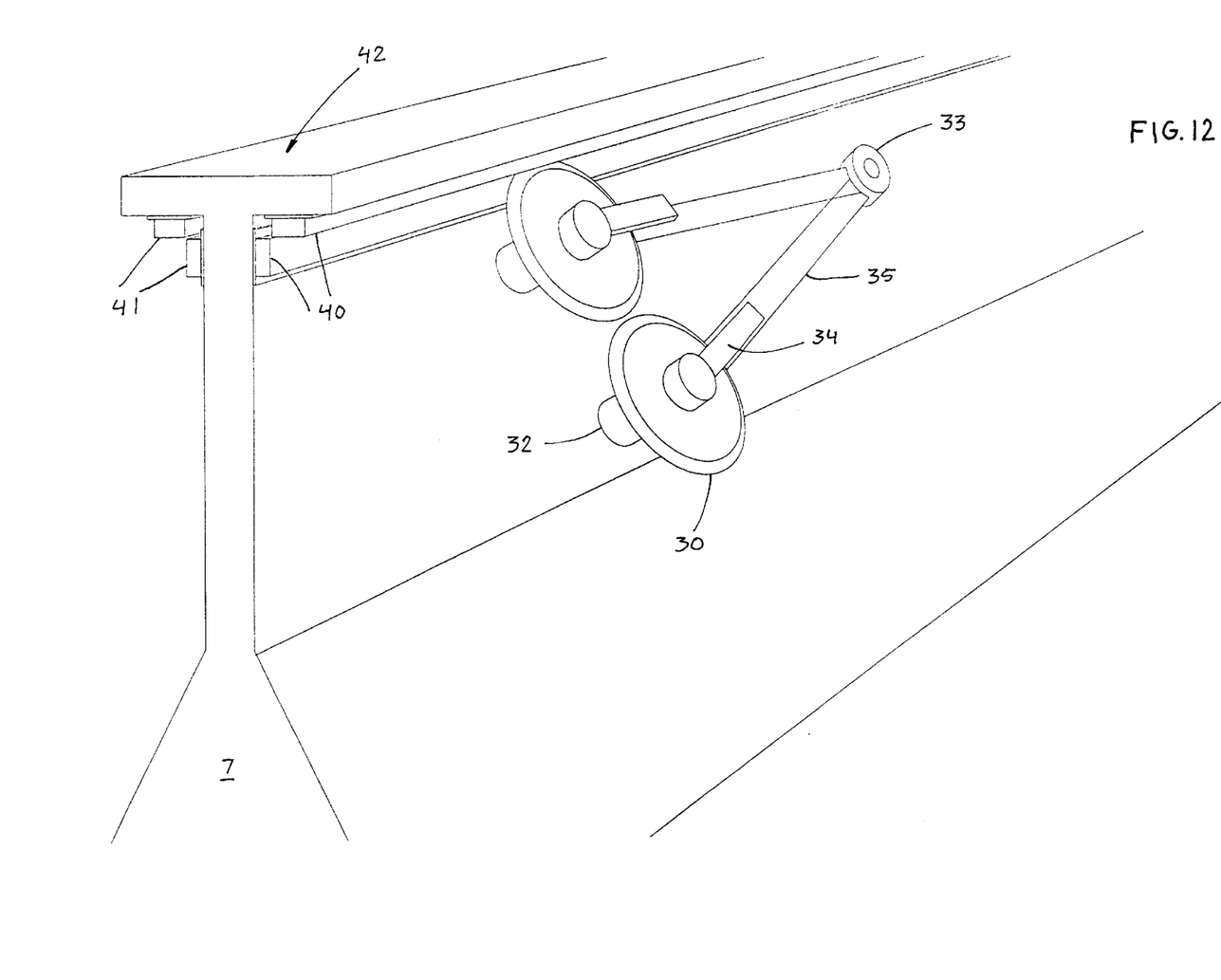
FIG. 12 shows a side view of the power transmission means of the invention, FIG. 13 discloses a first embodiment of a mounting system for the power unit.

For this purpose, each disc 30 is mounted on a lever 35, which is pivotably mounted on the dual-mode vehicle 1 by means of a bearing 33, whereby the lever 35 is kept engaged on the conductive areas by means of a resilient suspension means (not shown), for instance arranged in connection with the bearing 33.

Electrical contact between the rotating disc 30 and the vehicle is established by means of a pin 31 made of carbon which presses against the center of the disc 30. The pin 31 is stationary mounted on the lever 35 and is provided with a cable (not shown) which is connected to the vehicle electric system. The carbon pin 31 ensures that power is transmitted to the vehicle almost without friction losses. The pin 31 may alternatively be of metal.

When the vehicle is driving on the rail a relatively small amount of friction occurs between the rotating disc 30 and the conductive areas 40, 41 of the power rail. Thereby good electrical contact is ensured.

The transmission system 36 and especially the disc 30 are, as mentioned above, also adapted to engage the contact means 29 shown on FIG. 10 of the power unit 11.

Figure 13:
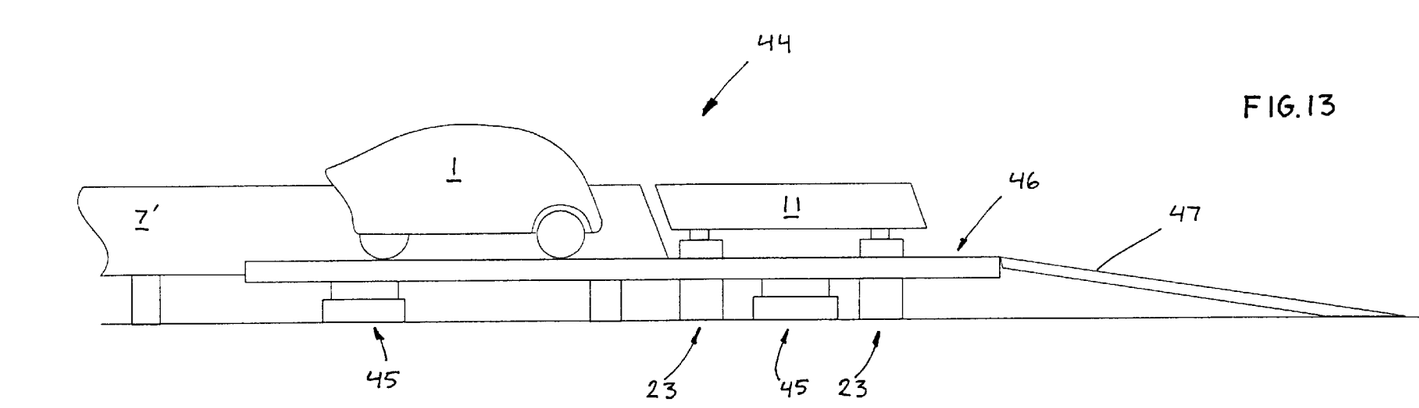
Figure 14:
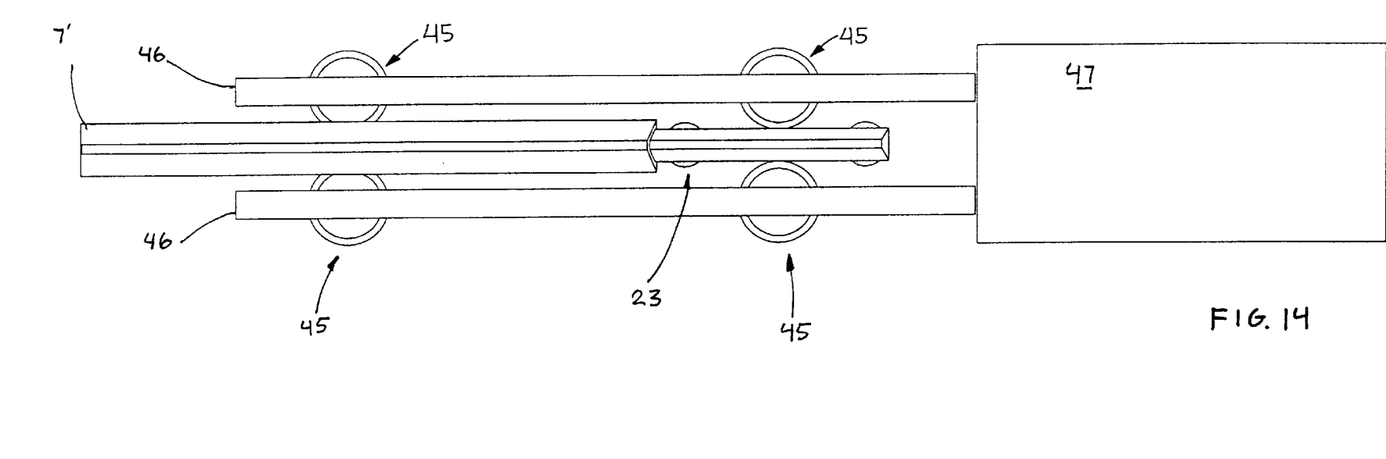
FIG. 14 is a top view of FIG. 13, wherein the dual-mode vehicle has been omitted.

A first embodiment of a mounting system 44 according to the invention is shown on FIGS. 13 and 14. The mounting system 44 comprises a rail section 7' and a replaceable power unit 11 which are arranged in direct continuation of the rail section 7', so that a dual-mode vehicle 1 can move directly from the rail section 7' on to the power unit 11. Furthermore, the mounting system 44 comprises a platform area 46, supporting the road wheels 8 of the vehicle, and an elevator means 23 for carrying the power unit 11 and completely or partly the weight of the vehicle 1 and for lowering or lifting the power unit 11. A ramp 47 is hinged to the edge of the platform area. The elevator means 23 can, as mentioned above, be constituted by a hydraulic lift.

The rail section 7' of the mounting system may be arranged in direct continuation of a longer rail road 7 or it may form an independent station, i.e. like a gas station, to which there is access via road.

When the driver realizes that the power unit 11 needs to be replaced or when the driver comes from the rail and wants to go for a longer distance on road and needs a power unit to be inserted, the driver goes to a position on the mounting station as shown in FIG. 13.

The dual-mode vehicle 1 would normally be provided with a wheel directing means (not shown) which guides the front wheels in a direction straight ahead, so that the driver's action to the steering wheel has no effect on the front wheels when the dual-mode vehicle is placed on a rail.

The position of the rail section 7' being in precise alignment with and in direct continuation of the rail section ensures that the vehicle is being placed on a lateral reference position. This means, among other things, that the rail interface 6 of the dual-mode vehicle and the power unit can be produced to match one another within very narrow tolerances, effectuating a very reliable, smooth and efficient mounting procedure.

In a first embodiment of the mounting system a platform elevator means 45 is provided for lifting/lowering an area of the platform 46 supporting the road wheels 8 of the vehicle, whereby the platform elevator 45 functions independently from the elevator means 23 carrying the power unit. Preferably the rail section 7' comprises a vehicle weight measuring unit (not shown) for determining the weight of the vehicle 1 and its load and a control unit (not shown) for controlling the platform elevator means 45, whereby the control unit is monitoring the vehicle weight measuring unit and controlling the height of the platform supporting the road wheels 8, so that the vehicle is only exerting a maximum allowable force on the rail section 7', before the vehicle is ready to move on to the replaceable power unit.

In this manner it is achieved, that the structural strength of the power unit 11, cf. FIG. 5, can be optimized, so that the structural components of the power unit only require a minimum of bulk and weight, thereby keeping the overall weight of the power system down and consequently enhancing the energy efficiency of the system.

As the skilled person in the art would readily realize, the replaceable power unit can be brought to a position on the power unit elevator means 23, shown in FIGS. 13 and 14, by a number of well known conveyor band/transportation methods. It will also be understood, that the mounting unit 44 advantageously could be in communication with a store of charged/discharged power units.

It would, however, also be possible to manually insert the power unit in the vehicle by placing the power unit in position by means of a trolley/jack unit.

When the power unit is empty and has to be disposed of, the driver of the vehicle could go to a station where the power unit would be recharged and serviced. Naturally, such a station could offer both disposal of a used power unit and insertion of a recharged power unit by means of a mounting system described above.

What is claimed is:

1. A power unit for an electrically operated dual-mode vehicle, the dual-mode vehicle comprising a plurality of road wheels for moving on a roadway, a centrally disposed, downwardly opening, groove-shaped rail interface extending in a longitudinal direction of the dual-mode vehicle, the rail interface having a cross-sectional profile which corresponds to the cross-sectional profile of a substantially triangular rail, and including a power transmission means for engaging an electrically conductive section of the rail and a set of rail wheels for engaging the rail, the power unit comprising:

an energy store capable of transferring energy as electric current to the dual-mode vehicle, means for coupling the power unit to a dual-mode vehicle, the coupling means attachable to the dual-mode vehicle such that force from the rail wheels is exertable upon the power unit;

a contact member engageable with the power transmission means, a substantially elongate shape, to, in turn, enable the power unit to be selectively positionable within the rail interface and directly engageable with the rail wheels.

2. The power unit according to claim 1 further including a holding member, the holding member attachable to an elevator member to facilitate raising and lowering of the power unit relative to a dual-mode vehicle, to in turn facilitate attachment thereto.

3. The power unit according to claim 1 further including the contact member comprising at least one semi-circular spring blade engageable with the disc of the power transmission means.

4. The power unit according to claim 1 further including a plurality of indents on a lower region thereof, the plurality of indents engageable with the rail wheels to in turn, form rests therefor.

5. The power unit according to claim 4 wherein the plurality of indents engageable with the rail wheels comprise a plurality of indents resiliently engageable with the rail wheels, to in turn facilitate retention of the power unit within the rail interface.

6. The power unit according to claim 1 further including:

a front panel, a rear panel opposite the front panel and a underside;

a combustion engine;

a generator associated with the combustion engine and the energy store; and a fuel storage tank, the tank including an inlet situated at one of the front and rear panels; and an exhaust pipe associated with the combustion engine and at least one of the rear panel and the underside.

7. The power unit according to claim 1 wherein the energy store comprises a battery.

8. The power unit according to claim 1 further including:

a fuel cell associated with the energy store; and a fuel storage tank associated with the fuel cell.

9. An electrically operated dual-mode vehicle comprising:

a plurality of road wheels for moving on a roadway;

a centrally disposed, downwardly opening, groove-shaped rail interface extending in a longitudinal direction, the rail interface having a cross-sectional profile which corresponds to the cross-sectional profile of a substantially triangular rail, the rail interface including a power transmission means for engaging an electrically conductive section of the rail and a set of rail wheels for engaging the rail; and a substantially elongate power unit selectively positioned within the rail interface including:

an energy store;

means for coupling the power unit to the dual-mode vehicle, wherein the rail wheels exert a downwardly directed force on the power unit;

a contact member associated with the energy store and engageably associated with the power transmission means.

* * * * *